United States Patent
Lee et al.

(10) Patent No.: US 9,001,491 B2
(45) Date of Patent: Apr. 7, 2015

(54) MULTILAYER CERAMIC CAPACITOR AND CIRCUIT BOARD WITH MULTILAYER CERAMIC CAPACITOR MOUNTED THEREON

(71) Applicant: Samsung Electro-Mechanics Co., Ltd., Suwon, Gyunggi-do (KR)

(72) Inventors: Ki Yong Lee, Gyunggi-do (KR); Sang Hyuk Kim, Gyunggi-do (KR); Min Gon Lee, Gyunggi-do (KR); Sung Hyung Kang, Gyunggi-do (KR); Jae Yeol Choi, Gyunggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 168 days.

(21) Appl. No.: 13/739,681

(22) Filed: Jan. 11, 2013

(65) Prior Publication Data

US 2014/0168851 A1    Jun. 19, 2014

(30) Foreign Application Priority Data

Dec. 18, 2012    (KR) .................. 10-2012-0148251

(51) Int. Cl.
| | | |
|---|---|---|
| H01G 4/30 | (2006.01) | |
| H01G 4/228 | (2006.01) | |
| H01G 4/012 | (2006.01) | |
| H01G 4/232 | (2006.01) | |
| H01G 4/12 | (2006.01) | |

(52) U.S. Cl.
CPC ............... *H01G 4/30* (2013.01); *H01G 4/012* (2013.01); *H01G 4/12* (2013.01); *H01G 4/232* (2013.01)

(58) Field of Classification Search
CPC .......... H01G 4/30; H01G 4/232; H01G 4/012
USPC ..................... 361/301.4, 303, 311, 306.3
See application file for complete search history.

(56) References Cited

U.S. PATENT DOCUMENTS

| | | | | |
|---|---|---|---|---|
| 6,787,700 | B2 * | 9/2004 | Nagao et al. .......... | 174/541 |
| 8,614,877 | B2 * | 12/2013 | Kim ............... | 361/321.2 |
| 2013/0050893 | A1 * | 2/2013 | Kim ............... | 361/306.3 |

FOREIGN PATENT DOCUMENTS

| | | |
|---|---|---|
| JP | 10-289837 A | 10/1998 |
| JP | 2009-054973 A | 3/2009 |
| JP | 2009-054974 A | 3/2009 |

* cited by examiner

*Primary Examiner* — Eric Thomas
(74) *Attorney, Agent, or Firm* — McDermott Will & Emery LLP (57) ABSTRACT

A multilayer ceramic capacitor includes a ceramic body having first and second main surfaces opposing one another, first and second lateral surfaces opposing one another, and first and second end surfaces opposing one another. First and second internal electrodes have an overlap region with lead out portions exposed to the first lateral surface of the ceramic body. An insulating layer is formed to cover the overlap region of the lead out portions exposed to the first lateral surface of the ceramic body; and first and second external electrodes are formed on the first lateral surface of the ceramic body on which the insulating layer is formed and electrically connected to the first and second internal electrodes. Thicknesses of the insulating layer from the first lateral surface and the first and second external electrodes from the first lateral surface are specified.

20 Claims, 8 Drawing Sheets

MULTILAYER CERAMIC CAPACITOR AND CIRCUIT BOARD WITH MULTILAYER CERAMIC CAPACITOR MOUNTED THEREON

CROSS-REFERENCE TO RELATED APPLICATIONS

This application claims the priority of Korean Patent Application No. 10-2012-0148251 filed on Dec. 18, 2012, in the Korean Intellectual Property Office, the disclosure of which is incorporated herein by reference.

BACKGROUND OF THE INVENTION

1. Field of the Invention

The present invention relates to a multilayer ceramic capacitor and a circuit board allowing a multilayer ceramic capacitor to be mounted thereon.

2. Description of the Related Art

In general, electronic components using a ceramic material such as capacitors, inductors, piezoelectric elements, varistors, thermistors, and the like, include a ceramic main body made of a ceramic material, internal electrodes formed within the ceramic main body, and external electrodes installed on surfaces of the ceramic main body such that they are connected to the internal electrodes.

Among ceramic electronic components, multilayer ceramic capacitors (MLCCs) include a plurality of laminated dielectric layers, internal electrodes disposed to face each other with a dielectric layer interposed therebetween, and external electrodes electrically connected to the internal electrodes.

MLCCs are commonly used as components in mobile communications devices such as portable computers, personal digital assistants (PDAs), mobile phones, and the like, due to inherent advantages thereof, such as compactness, guaranteed high capacitance, and ease of mountability.

Recently, as electronic products have been reduced in size and have had multifunctionality implemented therein, chip components have also become compact and highly functional, and consequently, multilayer ceramic capacitors which are small but have a high capacity are in demand.

Also, an MLCC disposed within a power circuit may be advantageously used as a bypass capacitor in a large scale integrated circuit (LSI), and in order for an MLCC to serve as a bypass capacitor therein, the MLCC is required to be able to effectively cancel high frequency noise. Such a requirement is increasing as electronic devices increasingly use high frequencies. An MLCC used as a bypass capacitor is electrically connected to a mounting pad of a circuit board through soldering and the mounting pad may be connected to a further external circuit through a wiring pattern or a conductive via.

An MLCC has equivalent series resistance (ESR) and equivalent series inductance (ESL) components, in addition to a capacitance component, and the ESR and ESL components may reduce a function of the bypass capacitor. In particular, ESL increases inductance of the capacitor at a low frequency to dampen high frequency noise canceling characteristics.

RELATED ART DOCUMENT (Patent document 1) Japanese Laid Open Publication No. 1998-289837

SUMMARY OF THE INVENTION

An aspect of the present invention provides a multilayer ceramic capacitor having excellent capacitance and excellent mounting density, and a manufacturing method thereof.

According to an aspect of the present invention, there is provided a multilayer ceramic capacitor including: a ceramic body having first and second main surfaces opposing one another, first and second lateral surfaces opposing one another, and first and second end surfaces opposing one another; first and second internal electrodes having an overlap region, the overlap region having lead out portions exposed to the first lateral surface of the ceramic body; an insulating layer formed to cover the overlap region of the lead out portions exposed to the first lateral surface of the ceramic body; and first and second external electrodes formed on the first lateral surface of the ceramic body, on which the insulating layer is formed, and electrically connected to the first and second internal electrodes, respectively, wherein when a thickness of the insulating layer from the first lateral surface is A and a thickness of the first and second external electrodes from the first lateral surface is B, $1.10 \leq B/A \leq 1.30$ is satisfied.

The first external electrode may be connected to a region of the lead out portion of the first internal electrode, not overlapped with the lead out portion of the second internal electrode, and the second external electrode may be connected to a region of the lead out portion of the second internal electrode, not overlapped with the lead out portion of the first internal electrode.

The first and second external electrodes may extend from the first lateral surface to any one of the first and second main surfaces.

The first and second external electrodes may extend from the first lateral surface to any one of the first and second main surfaces and the second lateral surface.

The first and second external electrodes may extend from the first lateral surface to the first and second main surfaces.

The first and second external electrodes may extend from the first lateral surface to a predetermined height on the first and second main surfaces.

The first and second external electrodes may be formed on the first lateral surface and may be in contact with (i.e., formed to extend to) corners formed by the first lateral surface and the first and second end surface, respectively.

The first and second external electrodes may be spaced apart from the corners formed by the first lateral surface and the first and second end surfaces by a predetermined interval.

The insulating layer may contain an organic resin, a ceramic, an inorganic filler, glass, or a mixture thereof.

The ceramic body may be longer in a length direction than in a width direction.

According to another aspect of the present invention, there is provided a circuit board for allowing a multilayer ceramic capacitor to be mounted thereon including: a printed circuit board having first and second electrode pads formed on an upper portion thereof; and a multilayer ceramic capacitor installed on the printed circuit board, wherein the multilayer ceramic capacitor includes: a ceramic body having first and second main surfaces opposing one another, first and second lateral surfaces opposing one another, and first and second end surfaces opposing one another; first and second internal electrodes having an overlap region, the overlap region having lead out portions exposed to the first lateral surface of the ceramic body; an insulating layer formed to cover the overlap region of the lead out portions exposed to the first lateral surface of the ceramic body; and first and second external electrodes formed on the first lateral surface of the ceramic body, on which the insulating layer is formed, and electrically connected to the first and second internal electrodes, respectively, wherein when a thickness of the insulating layer from the first lateral surface is A and a thickness of the first and second external electrodes from the first lateral surface is B, $1.10 \leq B/A \leq 1.30$ is satisfied.

The first and second electrode pads may have recesses for accommodating the first and second external electrodes therein, and the first and second external electrodes may be inserted into the recesses.

The first external electrode may be connected to a region of the lead out portion of the first internal electrode, not overlapped with the lead out portion of the second internal electrode, and the second external electrode may be connected to a region of the lead out portion of the second internal electrode, not overlapped with the lead out portion of the first internal electrode.

The first and second external electrodes may extend from the first lateral surface to any one of the first and second main surfaces.

The first and second external electrodes may extend from the first lateral surface to any one of the first and second main surfaces and the second lateral surface.

The first and second external electrodes may extend from the first lateral surface to the first and second main surfaces.

The first and second external electrodes may extend from the first lateral surface to a predetermined height on the first and second main surfaces.

The first and second external electrodes may be formed on the first lateral surface and may be in contact with corners formed by the first lateral surface and the first and second end surface, respectively.

The first and second external electrodes may be spaced apart from the corners formed by the first lateral surface and the first and second end surfaces by a predetermined interval.

The insulating layer may contain an organic resin, a ceramic, an inorganic filler, glass, or a mixture thereof.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

Figure 1A:
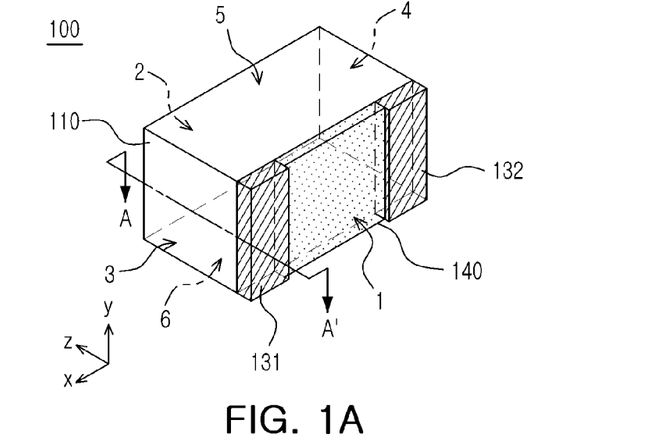
FIGS. 1A and 1B are schematic perspective views of multilayer ceramic capacitors (MLCCs) according to an embodiment of the present invention.
Figure 1B:
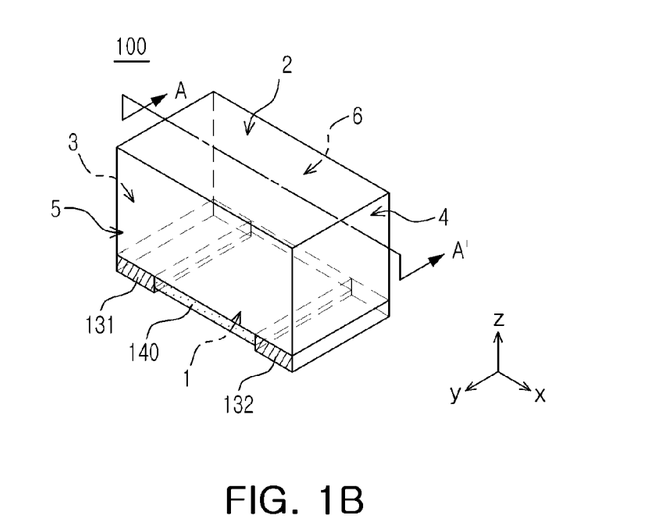

FIGS. 1A and 1B are schematic perspective views of multilayer ceramic capacitors (MLCCs) according to an embodiment of the present invention.

Figure 2:
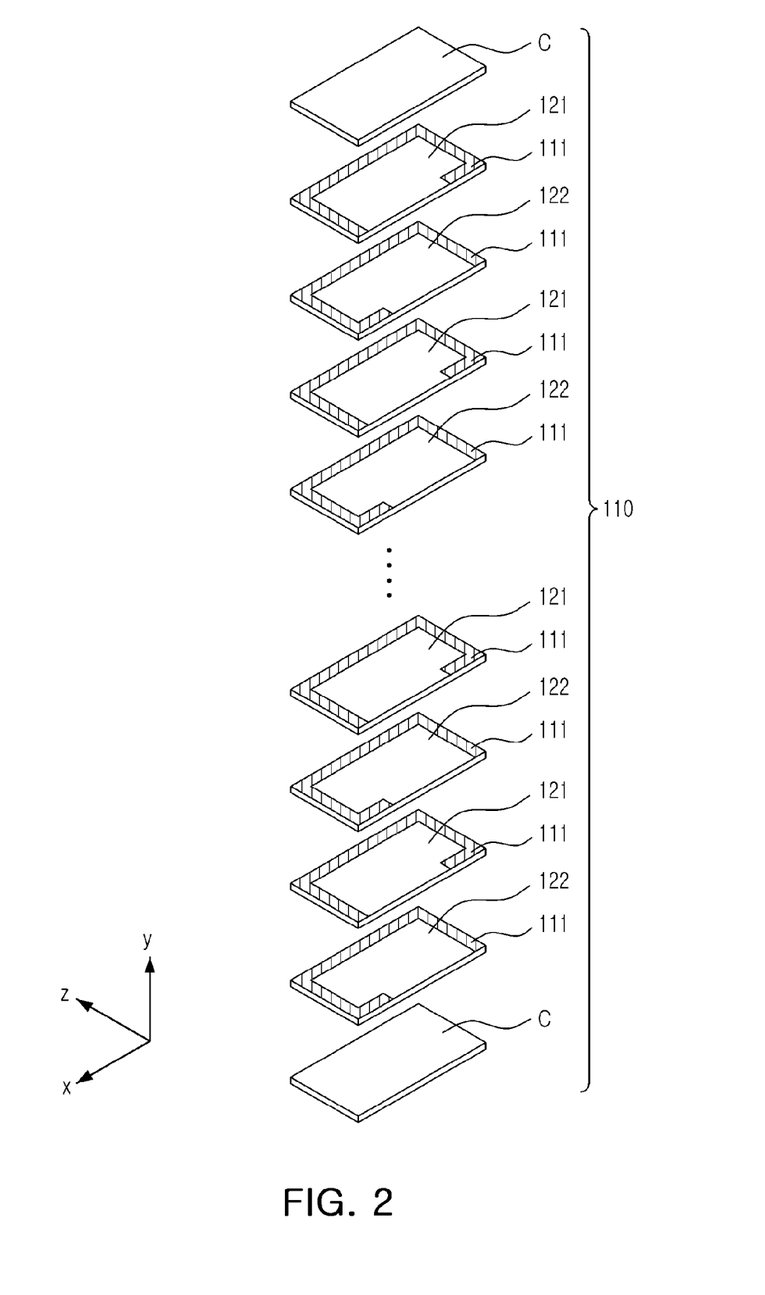
FIG. 2 is an exploded perspective view of a ceramic main body of the MLCC according to an embodiment of the present invention.

FIG. 2 is an exploded perspective view of a ceramic main body of the MLCC according to an embodiment of the present invention.

Figure 3:
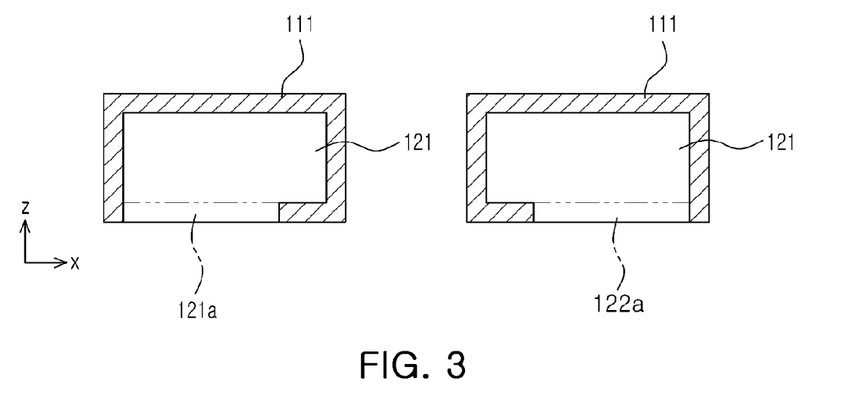
FIG. 3 is a plan view showing an internal electrode structure of the MLCC according to an embodiment of the present invention.

FIG. 3 is a plan view showing an internal electrode structure of the MLCC according to an embodiment of the present invention.

Figure 4:
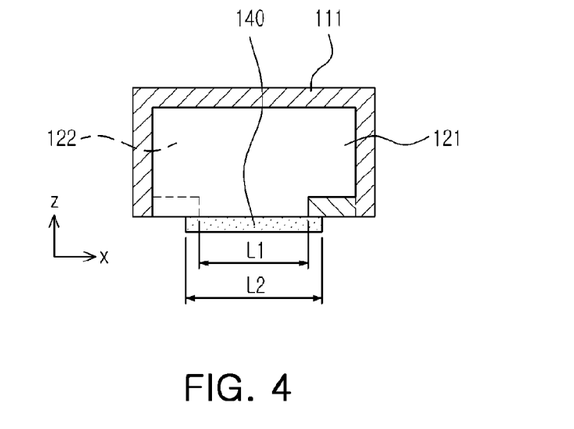
FIG. 4 is a x-z cross-sectional view illustrating the ceramic main body and an insulating layer of the MLCC according to an embodiment of the present invention.

FIG. 4 is a x-z cross-sectional view illustrating the ceramic main body and an insulating layer of the MLCC according to an embodiment of the present invention.

Figure 5A:
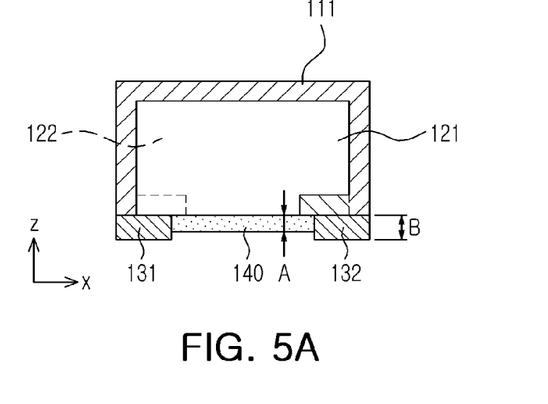
FIGS. 5A through 5C are x-z cross-sectional views of the MLCC according to an embodiment of the present invention.
Figure 5B:
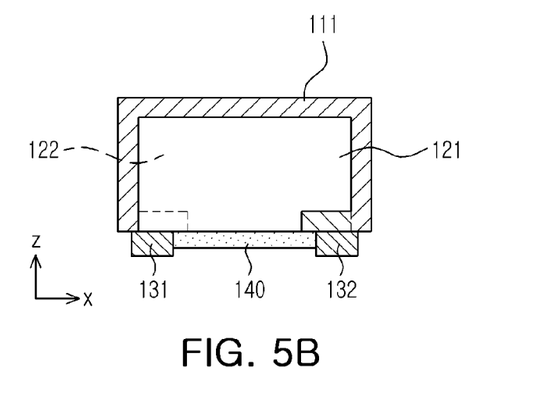
Figure 5C:
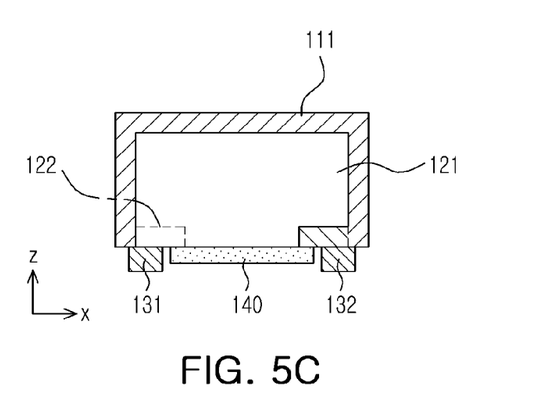

FIGS. 5A through 5C are x-z cross-sectional views of the MLCC according to an embodiment of the present invention.

FIGS. 6A through 6E are schematic perspective views of an MLCC having a modified external electrode according to an embodiment of the present invention.

Referring to FIGS. 1A and 1B, an MLCC 100 according to the present embodiment may include a ceramic body 110, first and second external electrodes 131 and 132, and an insulating layer 140.

In the present embodiment, the ceramic body 110 may have a first main surface 5 and a second main surface 6 opposing one another and a first lateral surface 1, a second lateral surface 2, a first end surface 3, and a second end surface 4 connecting the first main surface 5 and the second main surface 6. As illustrated, the ceramic body 110 may have a hexahedral shape, but the shape of the ceramic main body 110 is not particularly limited. When a chip is fired, the ceramic body 110 may not have a hexahedral shape with perfectly straight lines but may have a substantially hexahedral shape due to sintering shrinkage.

As illustrated in FIG. 2 as an exploded perspective view of the ceramic body 110, the ceramic body 110 may include a plurality of dielectric layers 111 and first and second internal electrodes 121 and 122 formed on the dielectric layers 111 and may be formed by laminating a plurality of dielectric layers with the internal electrodes formed thereon. Also, the first and second internal electrodes may be disposed in a y-axis direction such that they face each other with the dielectric layer 111 interposed therebetween.

According to an embodiment of the present invention, the y-axis direction may be a thickness direction of the ceramic body 110 in which the internal electrodes are laminated with the dielectric layer interposed therebetween, an x-axis direction may be a length direction of the ceramic body, and z-axis direction may be a width direction of the ceramic body.

The ceramic body 110 may be formed such that the length direction thereof is longer than the width direction or the thickness direction thereof.

According to an embodiment of the present invention, the plurality of dielectric layers 111 constituting the ceramic body 110 are in a sintered state in which adjacent dielectric layers are integrated such that boundaries therebetween may not be readily apparent.

The dielectric layers 111 may be formed by firing ceramic green sheets including ceramic powder, an organic solvent, and an organic binder. The ceramic powder is a material having a high K-dielectric constant (or high permittivity), and as the ceramic powder, for example, a barium titanate (BaTiO$_3$)-based material, a strontium titanate (SrTiO$_3$)-based material, or the like, may be used, but the present invention is not limited thereto.

According to an embodiment of the present invention, the first and second internal electrodes may be formed with conductive paste including a conductive metal. The conductive metal may be nickel (Ni), copper (Cu), palladium (Pd), or an alloy thereof, but the present invention is not limited thereto.

Also, the internal electrodes may be formed by printing the conductive paste on ceramic green sheets constituting the dielectric layers through a printing method such as a screen printing method or a gravure printing method, but the present invention is not limited thereto. The ceramic green sheets with the internal electrodes printed thereon may be alternately laminated and fired to form the ceramic body.

FIG. 3 is a plan view illustrating the dielectric layer 111 and the first and second internal electrodes 121 and 122 formed on the dielectric layer 111. Referring to FIG. 3, the first In order to be connected to external electrodes having different polarities, the first and second internal electrodes 121 and 122 have the first and second lead out portions 121a and 122a, respectively, and the first and second lead out portions 121a and 122a may be exposed to the first lateral surface 1 of the ceramic main body 110. Here, the first and second lead out portions 121a and 122a may be exposed to the same surface of the ceramic body 110.

According to an embodiment of the present invention, the lead out portions 121a and 121b of the internal electrodes 121 and 122 may refer to regions, of conductive patterns, having increased widths and being exposed to one surface of the ceramic body 110.

In general, first and second internal electrodes form capacitance by overlap regions thereof, and lead out portions connected to external electrodes having different polarities do not have an overlap region. However, according to an embodiment of the present invention, the first and second lead out portions 121a and 122a may have a mutual overlap region. According to an embodiment of the present invention, the first and second lead out portions 121a and 122a may be exposed to the first lateral surface and portions of the exposed regions may overlap.

According to an embodiment of the present invention, as illustrated in FIG. 4, the first insulating layer 140 may be formed on the first lateral surface of the ceramic body. The insulating layer 140 may cover the first and second lead out portions 121a and 122a exposed to the first lateral surface and cover the entirety of the overlap region of the first and second lead out portions 121a and 122a.

The insulating layer 140 may cover the first and second internal electrodes 121 and 122 exposed to the lateral surface and the end surfaces of the ceramic body 110 to prevent a short circuit between the internal electrodes and an internal defect such as a degradation of moisture resistance characteristics, or the like.

According to an embodiment of the present invention, the insulating layer 140 may include an organic resin, a ceramic, an inorganic filler, glass, or a mixture thereof, and made of slurry including an organic resin, a ceramic, an inorganic filler, glass, or a mixture thereof, but the present invention is not limited thereto. A formation position and height of the insulating layer 140 may be adjusted by regulating a quantity and form of the slurry. After the ceramic body 110 is formed through a firing process, the insulating layer 140 may be formed by coating slurry on the ceramic body 110 and subsequently firing the same.

Alternatively, slurry for forming an insulating layer may be formed on ceramic green sheets forming the ceramic body 110 and fired together therewith to thus form the insulating layer 140.

A method for forming the slurry is not particularly limited. For example, the slurry may be jetted according to a spraying method or may be coated by using a roller.

As illustrated in FIG. 4, when a length of the overlap region of the first and second lead out portions 121a and 122a is L1 and a length of the insulating layer 140 is L2, the insulating layer 140 may have a length equal to or greater than the length of the overlap region L1 (i.e., L1≤L2). If the insulating layer does not cover the entirety of the overlap region of the first and second lead out portions 121a and 122a, the first and second internal electrodes 121 and 122 may be electrically connected by the external electrodes or if the internal electrodes 121 and 122 are exposed to the outside, metal included in the internal electrodes 121 and 122 may be oxidized to reduce capacity.

Referring to FIGS. 5A through 5C, the first external electrode 131 may be connected to the first lead out portion 121a of the first internal electrode 121 led out to the first lateral surface of the ceramic body 110, and the second external electrode 132 may be connected to the second lead out portion 122a of the second internal electrode 122 led out to the first lateral surface of the ceramic body 110.

The first and second external electrodes 131 and 132 may include a conductive metal, and the conductive metal may be nickel (Ni), copper (Cu), tin (Sn), or an alloy thereof, but the present invention is not limited thereto.

The first external electrode 131 may be connected to a region, of the first lead out portion 121a, not overlapped with the second lead out portion 122a, and the second external electrode 132 may be connected to a region, of the second lead out portion 122a, not overlapped with the first lead out portion 121a.

The first external electrode 131 may be connected to a portion of the first lead out portion 121a such that it is not in contact with the second lead out portion 122a, and the second external electrode 132 may be connected to a portion of the second lead out portion 122a such that it is not in contact with the first lead out portion 121a.

According to an embodiment of the present invention, the first and second lead out portions 121a and 122a may have an overlap region and are connected to the first and second external electrodes 131 and 132 having different polarities.

The first and second external electrodes 131 and 132 may be formed in both sides of the insulating layer 140 on the first lateral surface.

As illustrated in FIG. 5A, when a thickness of the insulating layer 140 from the first lateral surface is A and a thickness of the first and second external electrodes 131 and 132 from the lateral surface is B, 1.10≤B/A≤1.30 may be satisfied.

If B/A exceeds 1.30, the external electrodes 131 and 132 may be excessively protruded to be warped or deformed. When the external electrodes are warped, they are damaged and when the MLCC is mounted on a substrate, the MLCC may not be properly in contact therewith.

Also, if B/A is less than 1.10, exposed areas of the external electrodes 131 and 132 are too small to secure contact areas of the external electrodes, making it difficult to stably mount the MLCC on a circuit board, and warping characteristics (will be described in detail in an experiment example) appear to be vulnerable after the MLCC is mounted on the circuit board.

Thus, preferably, the insulating layer 140 and the first and second external electrodes 131 and 132 are formed to satisfy a numeral expression $1.10 \leq B/A \leq 1.30$.

According to an embodiment of the present invention, as illustrated in FIG. 5A, the first and second external electrodes 131 and 132 may be in contact with the insulating layer 140 and formed to the corner formed by the first lateral surface and the first end surface and to the corner formed by the first lateral surface and the second end surface.

According to another embodiment of the present invention, as illustrated in FIG. 5B, the first and second eternal electrodes 131 and 132 may not be formed to extend to the corner formed by the first lateral surface and the first end surface or the corner formed by the first lateral surface and second end surface and may be spaced apart from the either corner by a predetermined interval. Also, illustrated in FIG. 5C, the first and second eternal electrodes 131 and 132 may be spaced apart from the insulating layer 140 by a predetermined interval.

As illustrated in FIG. 1, the first and second eternal electrodes 131 and 132 may be formed on the first lateral surface, and when the first and second eternal electrodes 131 and 132 are formed on the same surface of the MLCC, amounting area may be reduced to enhance a mounting density of a circuit board.

In addition, according to an embodiment of the present invention, the structure of the external electrodes may be variously modified, and as illustrated in FIGS. 6A through 6E, the external electrodes may extend to at least one of the first and second main surfaces and the second lateral surface.

Figure 6A:
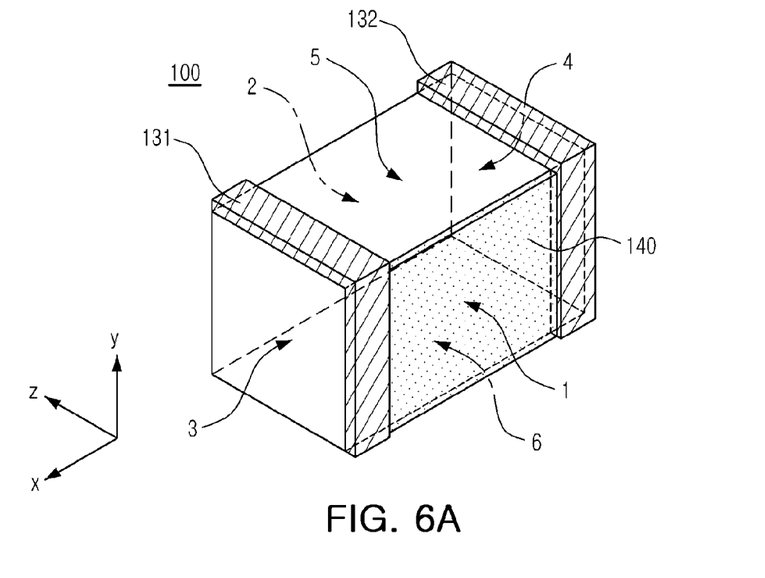
FIGS. 6A through 6E are schematic perspective views of an MLCC having a modified external electrode according to an embodiment of the present invention.
Figure 6B:
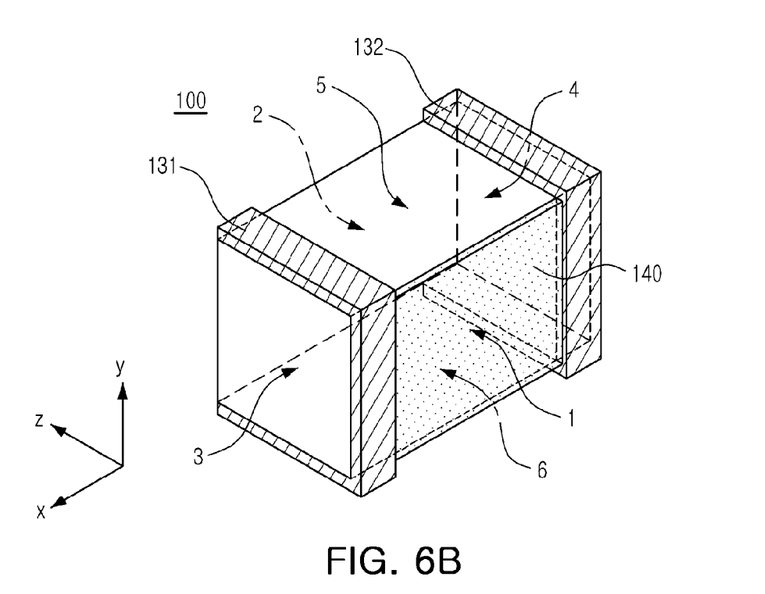
Figure 6C:
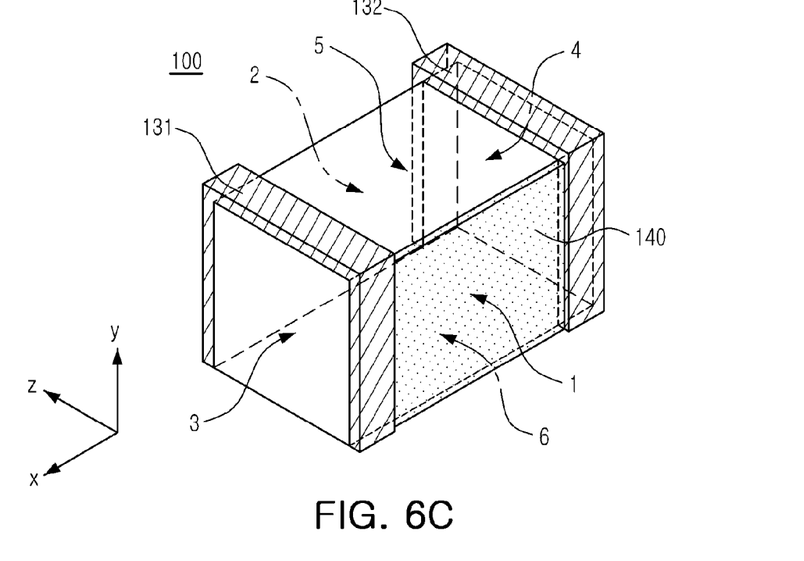

In detail, the first and second external electrodes 131 and 132 may extend from the first lateral surface to the first main surface (FIG. 6A), may extend to the first and second main surfaces (FIG. 6B), or may extend to one of the first and second main surfaces and the second lateral surface (FIG. 6C).

Figure 6D:
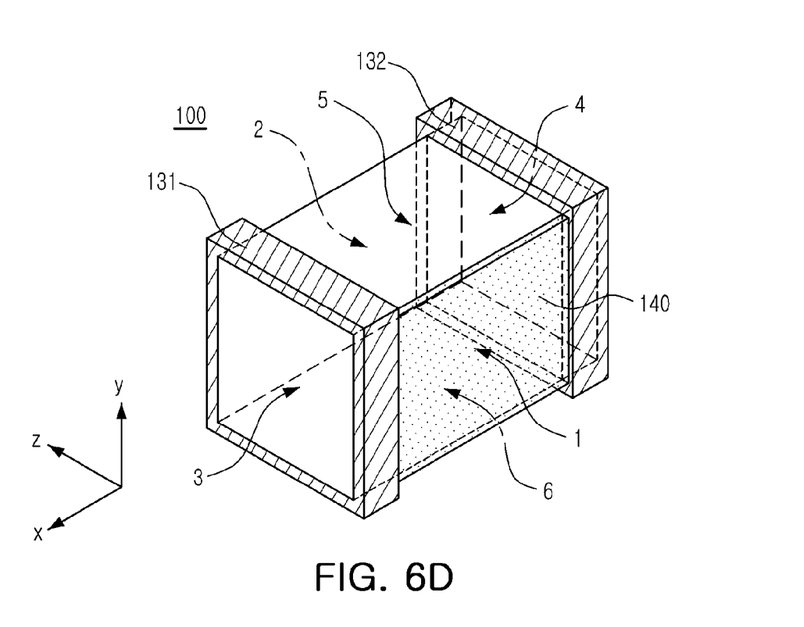
Figure 6E:
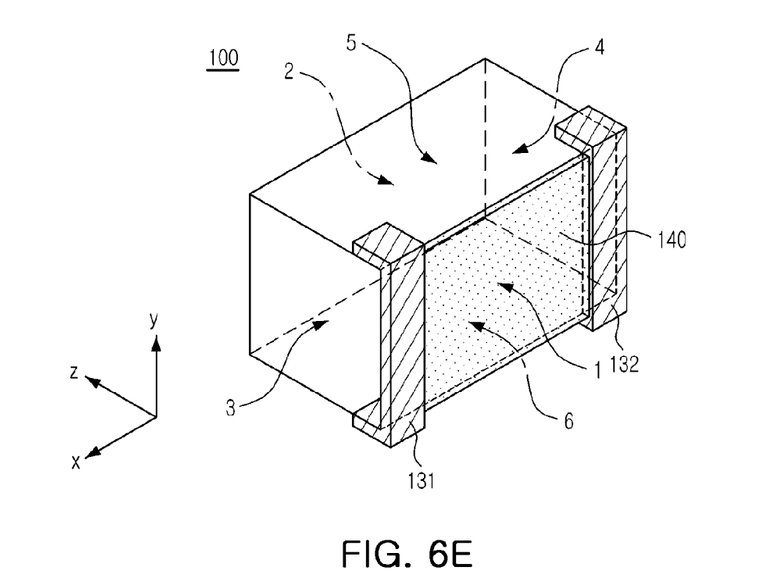

In addition, the first and second external electrodes 131 and 132 may extend from the first lateral surface to the second main surface and the second lateral surface and, in this case, the first and second external electrodes 131 and 132 may form a '☐' (a quadrangular shape) (FIG. 6D).

Also, the first and second external electrodes 131 and 132 may extend from the first lateral surface to predetermined heights (or predetermined portions) of the first and second main surfaces (FIG. 6E) or may extend from the first lateral surface to predetermined heights (or predetermined portions) of the first and second end surfaces (not shown).

When the first and second external electrodes 131 and 132 extend in the foregoing manners according to an embodiment of the present invention, a contact area of the MLCC with solders may be increased when the MLCC is mounted on a circuit board, securing landing stability to enhance sticking strength of the MLCC.

According to an embodiment of the present invention, since the lead out portions of the first and second internal electrodes have an overlap region, a capacity of the MLC can be increased. Also, since the distance between the first and second internal electrodes to which external polarities are applied is reduced, a current loop can be shortened, and thus, equivalent series inductance (ESL) can be lowered.

In addition, according to an embodiment of the present invention, the thickness A of the insulating layer 140 is smaller than the thickness B of the first external electrode 131 or the second external electrode 132, increasing the exposed area of the external electrodes. Thus, a contact area between the external electrodes and solders can be increased to allow the MLCC to be more stably mounted on a circuit board.

Circuit Board with MLCC Mounted Thereon

Figure 7:
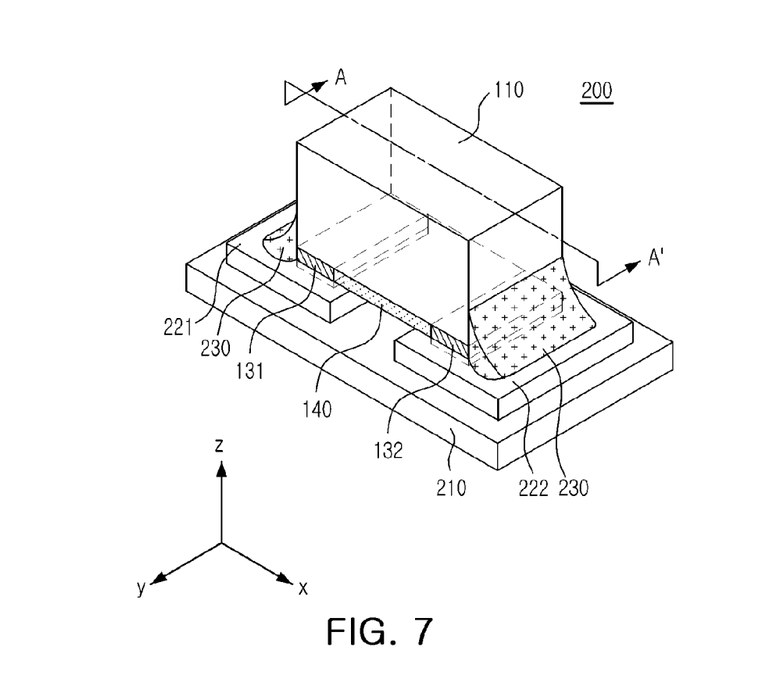
FIG. 7 is a view illustrating a circuit board with an MLCC mounted thereon according to an embodiment of the present invention.
Figure 8:
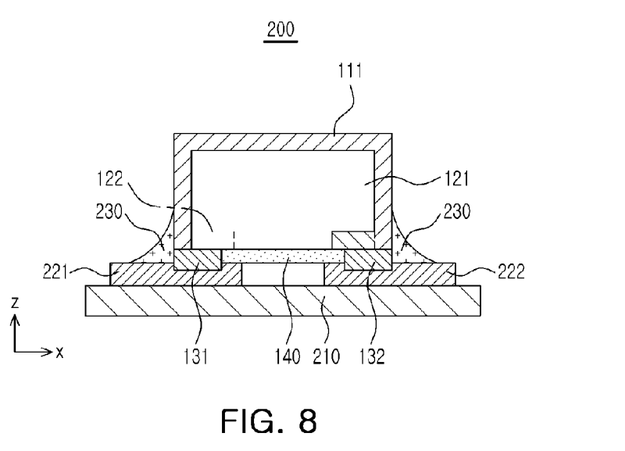
FIG. 8 is a cross-sectional view taken along line A-A' in FIG. 7.

Referring to FIGS. 7 and 8, a circuit board 200 with a multilayer ceramic capacitor (MLCC) according to the present embodiment mounted thereon may include a printed circuit board (PCB) 210, first and second electrode pads 221 and 222 formed to be spaced apart from one another on an upper surface of the PCB 210, and the MLCC 100 mounted on the PCB 210 and disposed to be in contact with the first and second electrode pads 221 and 222.

Here, the MLCC 100 may be electrically connected to the PCB 210 by solders 230 in a state in which the first and second external electrodes 131 and 132 thereof are positioned to be in contact with the first and second electrode pads 221 and 222.

The MLCC mounted on the circuit board has the same configuration as that described above, so a detailed description thereof will be omitted to avoid repetition.

The first and second electrode pads 221 and 222 may have recesses for accommodating the first and second external electrodes 131 and 132, and the first and second external electrodes 131 and 132 may be insertedly positioned in the recesses. When the thickness of the insulating layer, as a component of the MLCC according to an embodiment of the present invention, from the first lateral surface is A and the thickness of the first and second external electrodes 131 and 132 from the first lateral surface is B, $1.10 \leq B/A \leq 1.30$ is satisfied, so the first and second electrode pads 221 and 222 may have a recess having a depth similar to the thickness of the external electrodes 131 and 132 formed to be thicker than the insulating layer 140, respectively. Namely, the recesses may have a depth of approximately B−A.

When the external electrodes 131 and 132 are formed to be thicker than the insulating layer 140 and exposed and the exposed external electrodes are inserted into the recesses of the first and second electrode pads, mounting strength of the substrate may be further enhanced and, even when the substrate is warped due to external impact, or the like, electrical contact characteristics can be secured.

Experimental Example

Table 1 below shows data obtained by evaluating contact characteristics, warping characteristics of external electrodes, and strength characteristics by changing B/A values to recognize characteristics of the MLCC according to the thickness ratio (B/A) of the insulating layer 140 and the external electrodes 131 and 132. Here, a thickness of the insulating layer is indicated by B, and a thickness of the external electrodes is indicated by A.

The contact characteristics of each MLCC were measured by mounting each MLCC on a board and determining whether each MLCC was electrically connected. 1000 MLCCs were mounted, and a case that 20 or more MLCCs did not have contact characteristics is indicated as NG and a case that less than 20 MLCCs had contact characteristics is indicated as OK.

Also, as for the warping characteristics of external electrodes, a case that 20 or more MLCCs, among 1000 MLCCs, were warped during a transportation and mounting process is indicated as NG, and a case that less than 20 MLCCs were not warped is indicated as OK.

Figure 9:
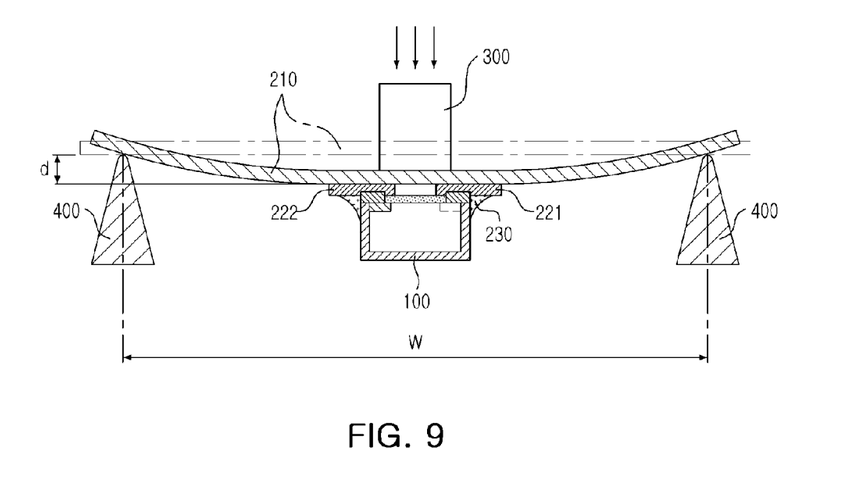
FIG. 9 is a view illustrating a method for evaluating warping strength characteristics in an experiment example.

The warping strength characteristics were measured in a manner as illustrated in FIG. 9. As illustrated in FIG. 9, a board 200 on which the MLCC 100 was mounted was disposed such that the MLCC 100 faced the ground, and two stanchions 400 were disposed at an interval W of approximately 90 mm under the board.

The MLCC 100 was positioned in a central point between the two stanchions 400 and an upper surface of the board on which the MLCC 100 was mounted was pressed by a pressurizer 300 such that the board 210 was warped to have a depth (d) equal to 1 mm downwardly for five seconds. After performing the foregoing process, a capacity of each MLCC was measured, and, among 1000 MLCCs, a case that 20 or more MLCCs of which a rate of change in capacity versus an initial capacity thereof was ±12.5% is indicated as NG, and less than 20 MLCCs of which a rate of change in capacity versus an initial capacity thereof was ±12.5% is indicated as OK.

TABLE 1

| B/A | Contact characteristics | External electrode warping characteristics | Warping strength characteristics |
|---|---|---|---|
| 1.05 | NG | OK | NG |
| 1.08 | OK | OK | NG |
| 1.10 | OK | OK | OK |
| 1.11 | OK | OK | OK |
| 1.20 | OK | OK | OK |
| 1.28 | OK | OK | OK |
| 1.30 | OK | OK | OK |
| 1.32 | OK | NG | OK |
| 1.35 | OK | NG | OK |

* indicates comparative example

According to Table 1, it can be seen that, when the B/A, the thickness ratio between the external electrode and the insulating layer, was equal to or less than 1.05, the MLCC did not have contact characteristics, and when B/A was less than 1.10, the MLCC was defective in the warping strength characteristics evaluation. Also, when the B/A exceeded 1.30, the external electrode was excessively exposed to generate a defective MLCC in the external electrode warping characteristics evaluation.

Thus, as described above in the present embodiment, it can be seen that the insulating layer and the external electrode are required to be formed to have a thickness ratio (B/A) satisfying $1.10 \leq B/A \leq 1.30$.

As set forth above, according to an embodiment of the present invention, since an overlap region of the first and second internal electrodes forming a capacitance formation part is increased, the capacity of the MLCC can be increased.

In addition, according to an embodiment of the present invention, by controlling dimensions of the external electrodes and the insulating layers, a mounting density of the MLCC can be enhanced and sticking force of the MLCC can be strengthened.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic capacitor comprising:
a ceramic body having first and second main surfaces opposing one another, first and second lateral surfaces opposing one another, and first and second end surfaces opposing one another;
first and second internal electrodes having an overlap region, the overlap region having lead out portions exposed to the first lateral surface of the ceramic body;
an insulating layer formed to cover the overlap region of the lead out portions exposed to the first lateral surface of the ceramic body; and
first and second external electrodes formed on the first lateral surface of the ceramic body, on which the insulating layer is formed, and electrically connected to the first and second internal electrodes, respectively,
wherein when a thickness of the insulating layer from the first late al surface is A and a thickness of the first and second external electrodes from the first lateral surface is B, $1.10 \leq B/A \leq 1.30$ is satisfied.

2. The multilayer ceramic capacitor of claim 1, wherein the first external electrode is connected to a region of the lead out portion of the first internal electrode, not overlapped with the lead out portion of the second internal electrode, and the second external electrode is connected to a region of the lead out portion of the second internal electrode, not overlapped with the lead out portion of the first internal electrode.

3. The multilayer ceramic capacitor of claim 1, wherein the first and second external electrodes are formed to extend from the first lateral surface to any one of the first and second main surfaces.

4. The multilayer ceramic capacitor of claim 1, wherein the first and second external electrodes extend from the first lateral surface to any one of the first and second main surfaces and the second lateral surface.

5. The multilayer ceramic capacitor of claim 1, wherein the first and second external electrodes extend from the first lateral surface to the first and second main surfaces.

6. The multilayer ceramic capacitor of claim 1, wherein the first and second external electrodes extend from the first lateral surface to a predetermined height on the first and second main surfaces.

7. The multilayer ceramic capacitor of claim 1, wherein the first and second external electrodes are formed on the first lateral surface and are in contact with corners formed by the first lateral surface and the first and second end surface, respectively.

8. The multilayer ceramic capacitor of claim 1, wherein the first and second external electrodes are spaced apart from the corners formed by the first lateral surface and the first and second end surfaces by a predetermined interval.

9. The multilayer ceramic capacitor of claim 1, wherein the insulating layer contains an organic resin, a ceramic, an inorganic filler, glass, or a mixture thereof.

10. The multilayer ceramic capacitor of claim 1, wherein the ceramic body is longer in a length direction than in a width direction.

11. A circuit board comprising a multilayer ceramic capacitor mounted thereon, the circuit board comprising:
a printed circuit board having first and second electrode pads formed on an upper portion thereof; and
a multilayer ceramic capacitor installed on the printed circuit board,
wherein the multilayer ceramic capacitor includes a ceramic body having first and second main surfaces opposing one another, first and second lateral surfaces opposing one another, and first and second end surfaces opposing one another, first and second internal electrodes having an overlap region therebetween, the overlap region having lead out portions exposed to the first lateral surface of the ceramic body, an insulating layer formed to cover the overlap region of the lead out portions exposed to the first lateral surface of the ceramic body, and first and second external electrodes formed on the first lateral surface of the ceramic body, on which the insulating layer is formed, and electrically connected to the first and second internal electrodes, respectively, wherein when a thickness of the insulating layer from the first lateral surface is A and a thickness of the first and second external electrodes from the first lateral surface is B, $1.10 \leq B/A \leq 1.30$ is satisfied.

12. The circuit board of claim 11, wherein the first and second electrode pads have recesses for accommodating the first and second external electrodes therein, and the first and second external electrodes are inserted into the recesses.

13. The circuit board of claim 11, wherein the first external electrode is connected to a region of the lead out portion of the first internal electrode, not overlapped with the lead out portion of the second internal electrode, and the second external electrode is connected to a region of the lead out portion of the second internal electrode, not overlapped with the lead out portion of the first internal electrode.

14. The circuit board of claim 11, wherein the first and second external electrodes extend from the first lateral surface to any one of the first and second main surfaces.

15. The circuit board of claim 11, wherein the first and second external electrodes extend from the first lateral surface to any one of the first and second main surfaces and the second lateral surface.

16. The circuit board of claim 11, wherein the first and second external electrodes extend from the first lateral surface to the first and second main surfaces.

17. The circuit board of claim 11, wherein the first and second external electrodes extend from the first lateral surface to a predetermined height on the first and second main surfaces.

18. The circuit board of claim 11, wherein the first and second external electrodes are formed on the first lateral surface and are in contact with corners formed by the first lateral surface and the first and second end surface, respectively.

19. The circuit board of claim 11, wherein the first and second external electrodes are spaced apart from the corners formed by the first lateral surface and the first and second end surfaces by a predetermined interval.

20. The circuit board of claim 11, wherein the insulating layer contains an organic resin, a ceramic, an inorganic filler, glass, or a mixture thereof.

* * * * *